(12) United States Patent
Yoshimura et al.

(10) Patent No.: US 10,968,809 B2
(45) Date of Patent: Apr. 6, 2021

(54) FLOW CONTROL VALVE AND COOLING SYSTEM

(71) Applicant: HITACHI AUTOMOTIVE SYSTEMS, LTD., Hitachinaka (JP)

(72) Inventors: Takeshi Yoshimura, Atsugi (JP); Shingo Murakami, Ebina (JP); Zhenyu Shen, Yanji (CN)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 60 days.

(21) Appl. No.: 16/331,884

(22) PCT Filed: Aug. 30, 2017

(86) PCT No.: PCT/JP2017/031128
§ 371 (c)(1),
(2) Date: Mar. 8, 2019

(87) PCT Pub. No.: WO2018/056004
PCT Pub. Date: Mar. 29, 2018

(65) Prior Publication Data
US 2019/0211738 A1    Jul. 11, 2019

(30) Foreign Application Priority Data

Sep. 21, 2016 (JP) .............................. JP2016-183645

(51) Int. Cl.
*F01P 3/20* (2006.01)
*F01P 7/16* (2006.01)
(Continued)

(52) U.S. Cl.
CPC ........ *F01P 3/20* (2013.01); *F01P 7/16* (2013.01); *F01P 7/165* (2013.01); *F16K 5/04* (2013.01);
(Continued)

(58) Field of Classification Search
CPC ....... F01P 3/20; F01P 7/165; F01P 7/16; F16K 5/04; F16K 11/076
See application file for complete search history.

(56) References Cited

U.S. PATENT DOCUMENTS

| 8,760,127 B2 * | 6/2014 | Sridharan | H02K 9/24 322/33 |
| 2004/0238159 A1 * | 12/2004 | Humburg | B60H 1/08 165/41 |

(Continued)

FOREIGN PATENT DOCUMENTS

| JP | 2004-076647 A | 3/2004 |
| JP | 2012-531559 A | 12/2012 |

(Continued)

OTHER PUBLICATIONS

PCT International Search Report (with English Language Translation) and Written Opinion (Japanese Language only) in corresponding International Application No. PCT/JP2017/031128 dated Nov. 21, 2017. 7 pages.

(Continued)

*Primary Examiner* — Kevin R Barss
(74) *Attorney, Agent, or Firm* — Foley & Lardner LLP

(57) ABSTRACT

Provided is a flow control valve and a cooling system, with which a pressure loss can be reduced. A rotor 12 includes a first guide portion 43 on the outer circumferential side of an extending portion 42 fixed to a drive shaft 13 and protruding into a space inside the rotor 12. The first guide portion 43 has a radial outer shape which increases from an x-axis positive direction side toward an x-axis negative direction side.

20 Claims, 12 Drawing Sheets

(51) Int. Cl.
*F16K 11/076* (2006.01)
*F16K 5/04* (2006.01)
*F01P 7/14* (2006.01)

(52) U.S. Cl.
CPC ....... *F16K 11/076* (2013.01); *F01P 2007/146* (2013.01)

(56) References Cited

U.S. PATENT DOCUMENTS

| | | |
|---|---|---|
| 2012/0160192 A1 | 6/2012 | Magnier-Cathenod et al. |
| 2016/0010536 A1 | 1/2016 | Murakami et al. |
| 2018/0051815 A1 | 2/2018 | Murakami |

FOREIGN PATENT DOCUMENTS

| | | |
|---|---|---|
| WO | WO-2014-148126 A1 | 9/2014 |
| WO | WO-2016-140079 A1 | 9/2016 |

OTHER PUBLICATIONS

PCT Third Party Observation, Submitted Jun. 20, 2018 (1 page).

\* cited by examiner

FLOW CONTROL VALVE AND COOLING SYSTEM

TECHNICAL FIELD

The invention relates to flow control valves and cooling systems.

BACKGROUND ART

The flow control valves generally known are those with a rotatable valve element (Patent Literature 1, for example).

CITATION LIST

Patent Literature

PTL 1: Japanese Unexamined Patent Application Publication (Kokai) No. 2004-76647

SUMMARY OF INVENTION

Technical Problem

The flow control valves in relevant art cause a large fluid pressure loss due to a valve-element supporting structure which is protruding inside a valve element.

An object of the invention is to provide a flow control valve and a cooling system, with which a pressure loss can be reduced.

Solution to Problem

According to a flow control valve of one embodiment of the invention, a valve element includes a first guide portion on an outer circumferential side of an extending portion which is fixed to a drive shaft and protruding into a space inside the valve element. The first guide portion has a radial outer shape which increases from one axial side toward the other axial side.

The one embodiment of the invention thus can reduce the pressure loss.

DESCRIPTION OF EMBODIMENTS

Embodiment 1

Figure 1:
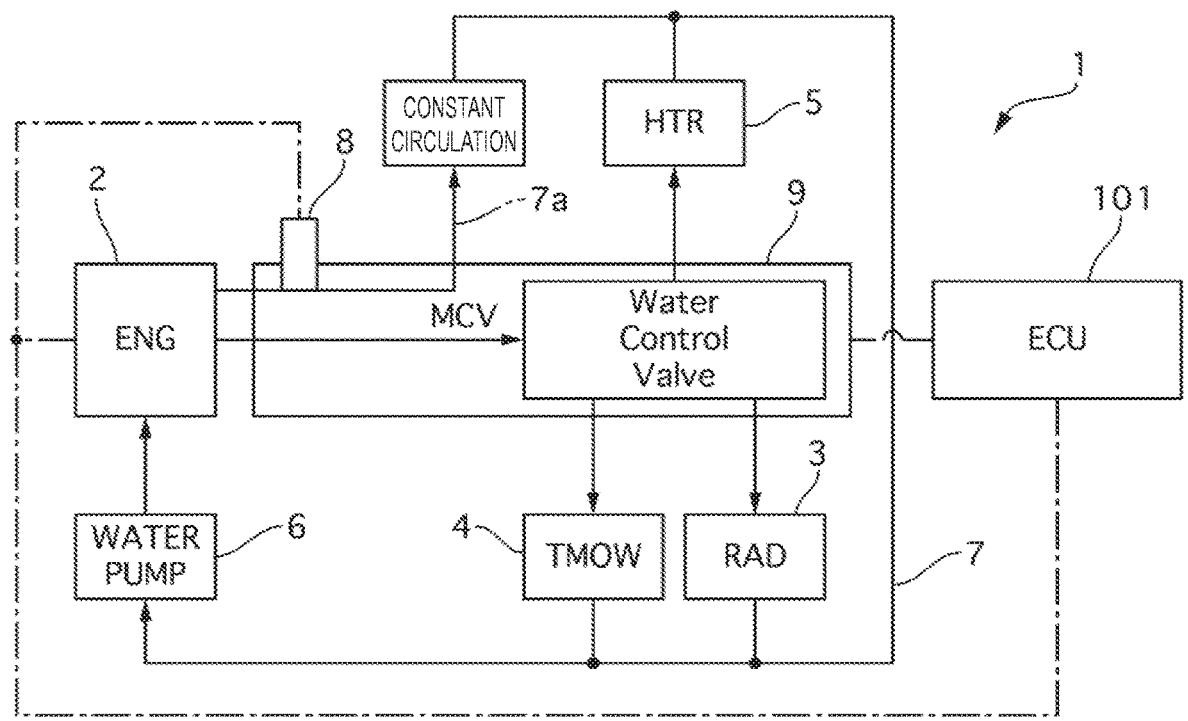
FIG. 1 is a schematic view of a cooling system 1 according to an Embodiment 1.

FIG. 1 is a schematic view of a cooling system 1 according to an Embodiment 1.

The cooling system 1 of the Embodiment 1 includes a circuit 7 configured to pass coolant (fluid), which has cooled an engine 2 functioning as a heat source, through a plurality of heat exchangers (radiator 3, transmission fluid warmer 4, heater 5) and then deliver the coolant back to the engine 2 via a water pump 6. The engine 2 is, for example, a gasoline engine installed in a vehicle. The radiator 3 cools the coolant through heat exchange between the coolant and relative wind. The transmission fluid warmer 4 cools the coolant through heat exchange between the coolant and a transmission fluid. The transmission fluid warmer 4 raises the temperature of the transmission fluid when the engine 2 is cold, and also functions as a fluid cooler for cooling the transmission fluid after the warm-up of the engine 2 is finished. The heater 5 cools the coolant through heat exchange between the coolant and the air blown into a vehicle interior while the vehicle interior is being heated. The water pump 6 is rotationally driven by a driving force of the engine 2 and feeds the engine 2 with the coolant from the radiator 3, the transmission fluid warmer 4, and the heater 5. The circuit 7 includes a normally-open water passage 7a for constantly circulating the coolant, bypassing the heat exchangers 3, 4 and 5. A water temperature sensor 8 for detecting coolant temperature (water temperature) is placed in the normally-open water passage 7a. A mechanical control valve (hereinafter, referred to as MCV) 9 is a flow rate control valve configured to adjust a flow rate of the coolant which is fed from the engine 2 to the heat exchangers 3, 4 and 5. The MCV 9 will be discussed later in details. An engine control unit 101 is configured to control a valve rotation angle of the MCV 9 in accordance with the water temperature detected by the water temperature sensor 8, information (engine negative pressure, throttle opening degree, etc.) of the engine 2, and the like.

A configuration of the MCV 9 will be now explained.

Figure 2:
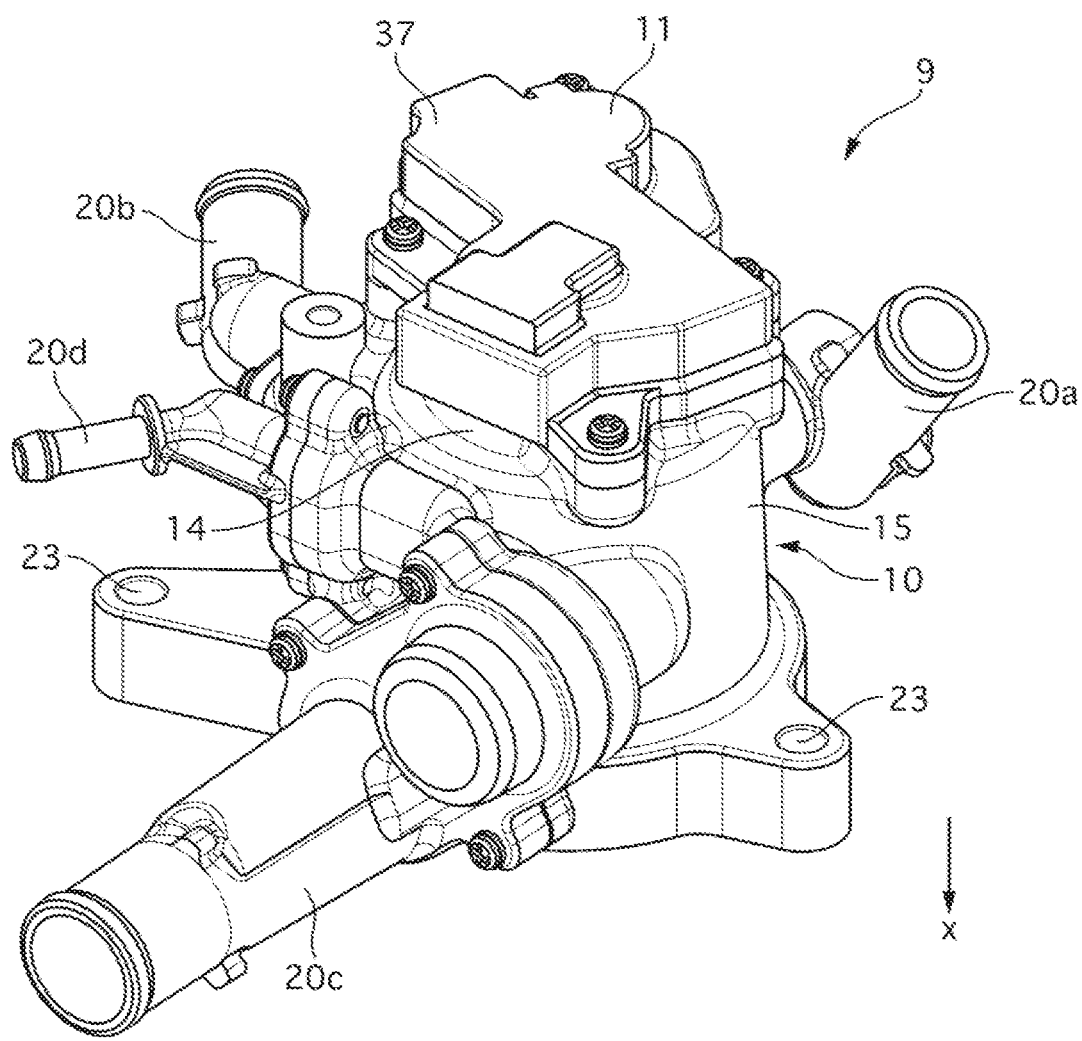
FIG. 2 is a perspective view of an MCV 9 according to the Embodiment 1.
Figure 3:
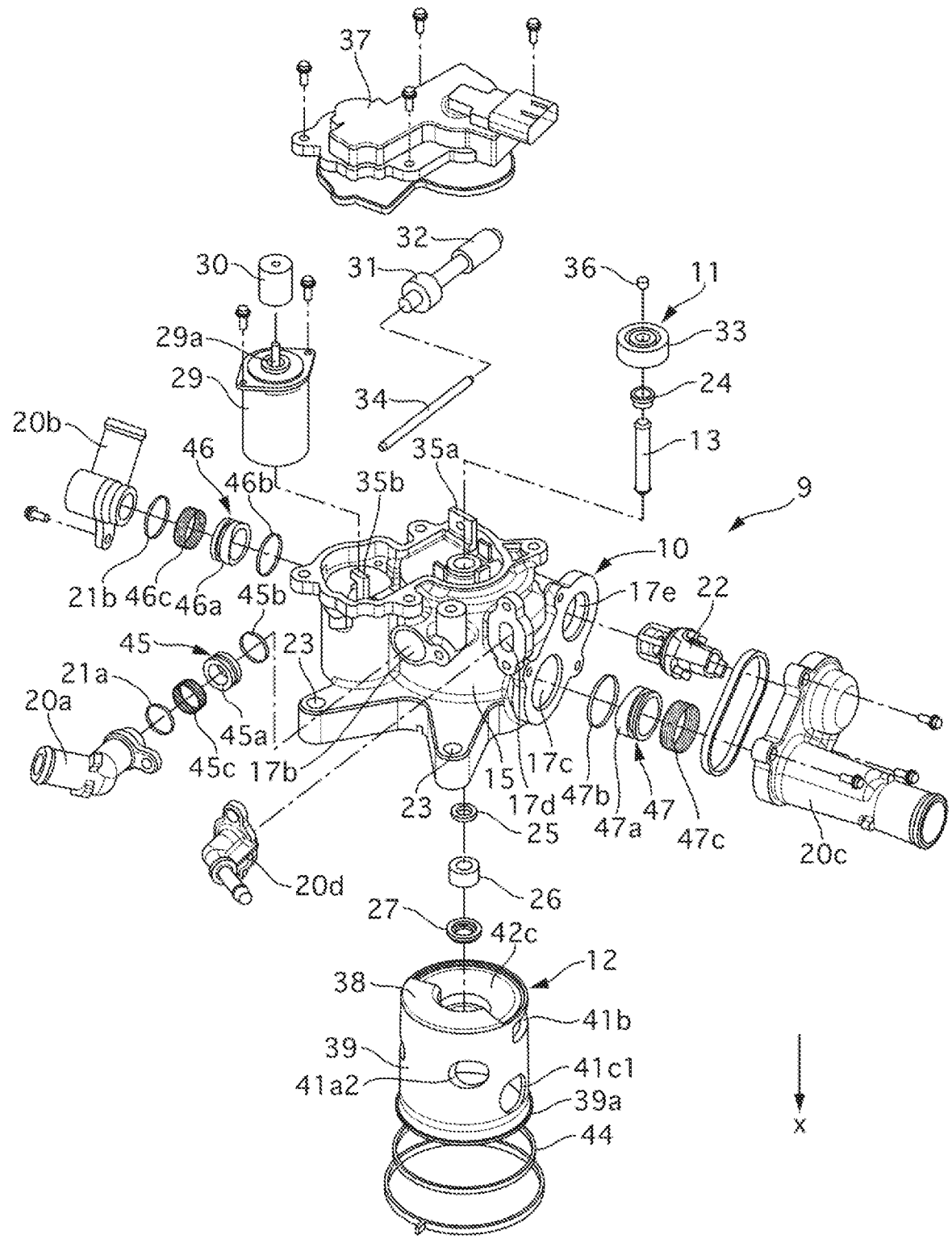
FIG. 3 is an exploded perspective view of the MCV 9 according to the Embodiment 1.
Figure 4:
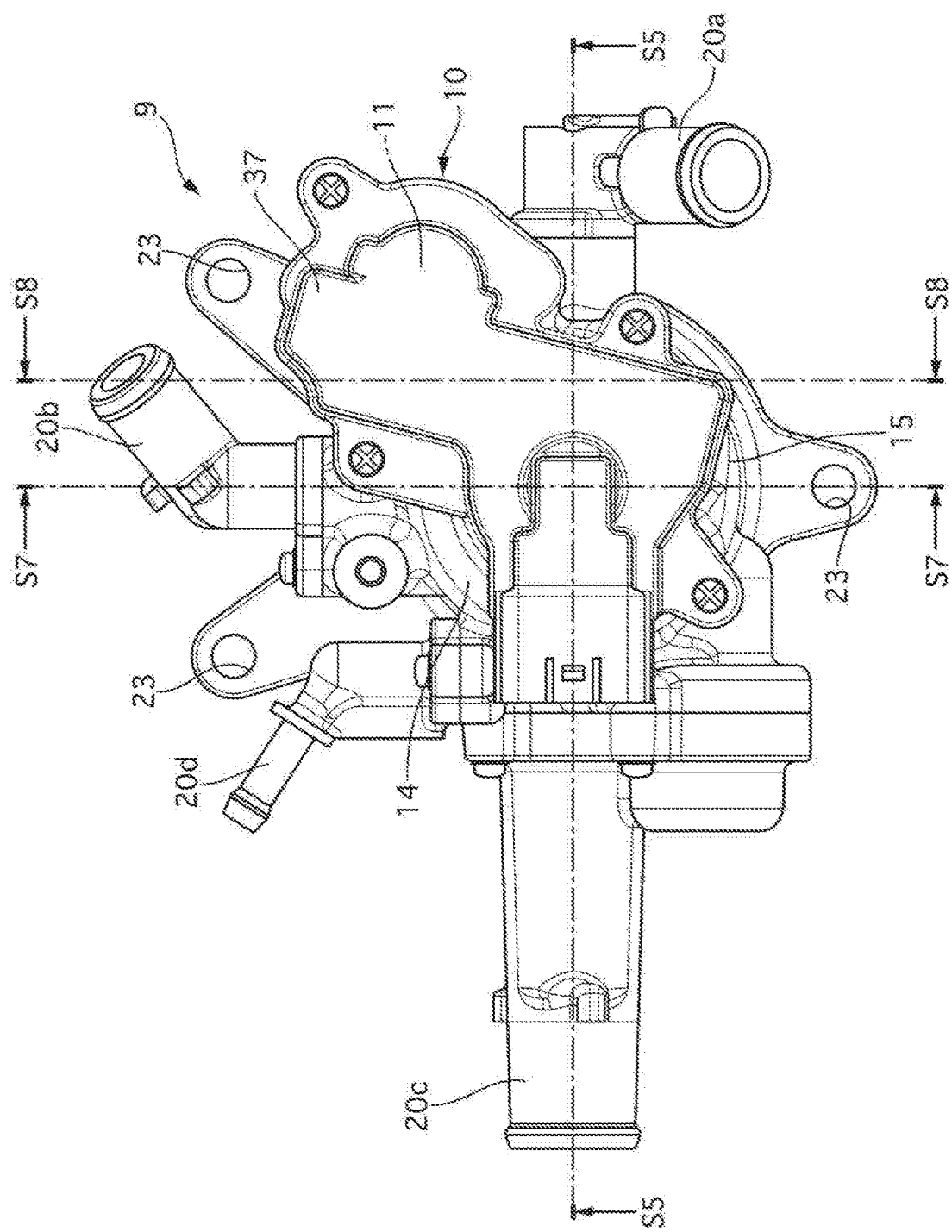
FIG. 4 is a plan view of the MCV 9 according to the Embodiment 1.
Figure 5:
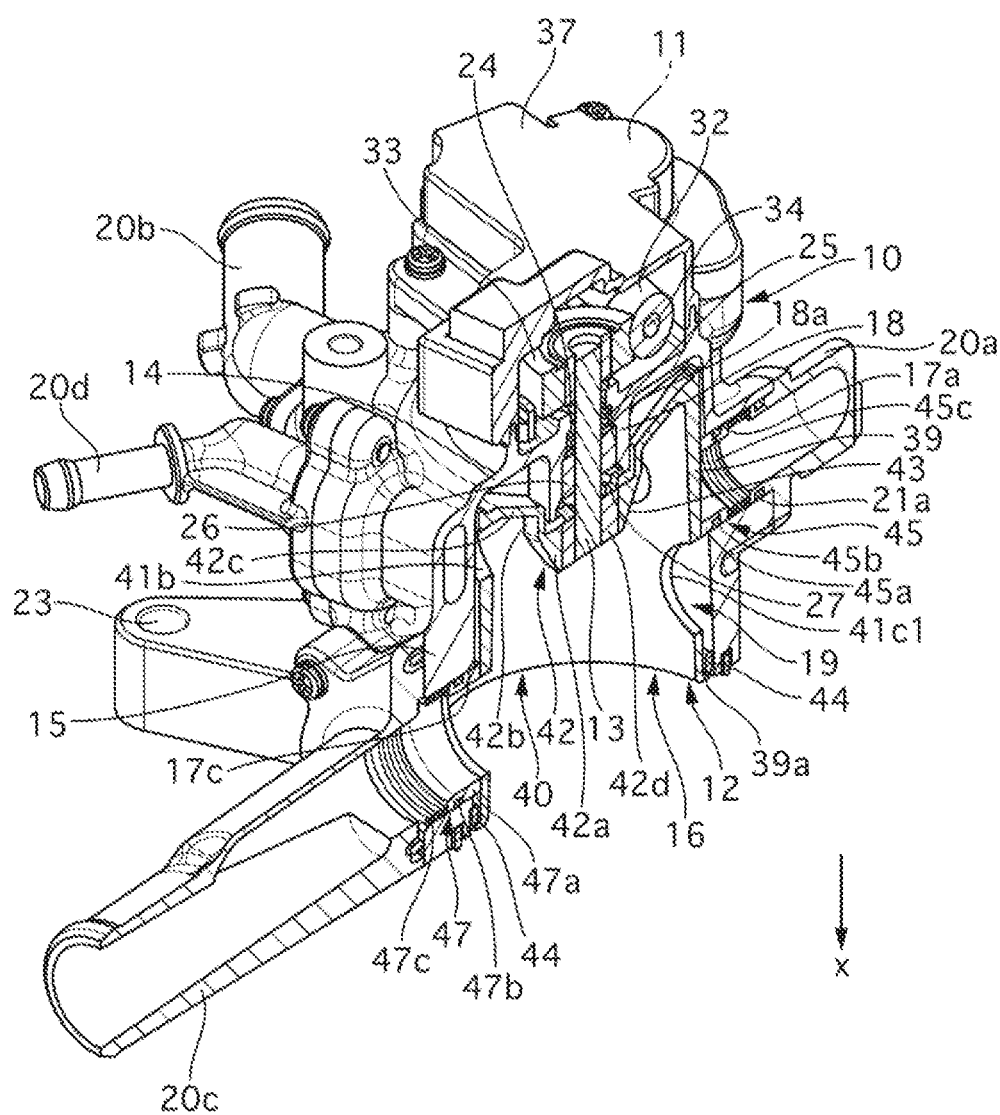
FIG. 5 is a perspective view of a section taken along line S5-S5 of FIG. 4 as viewed from the direction indicated by the arrow.
Figure 6:
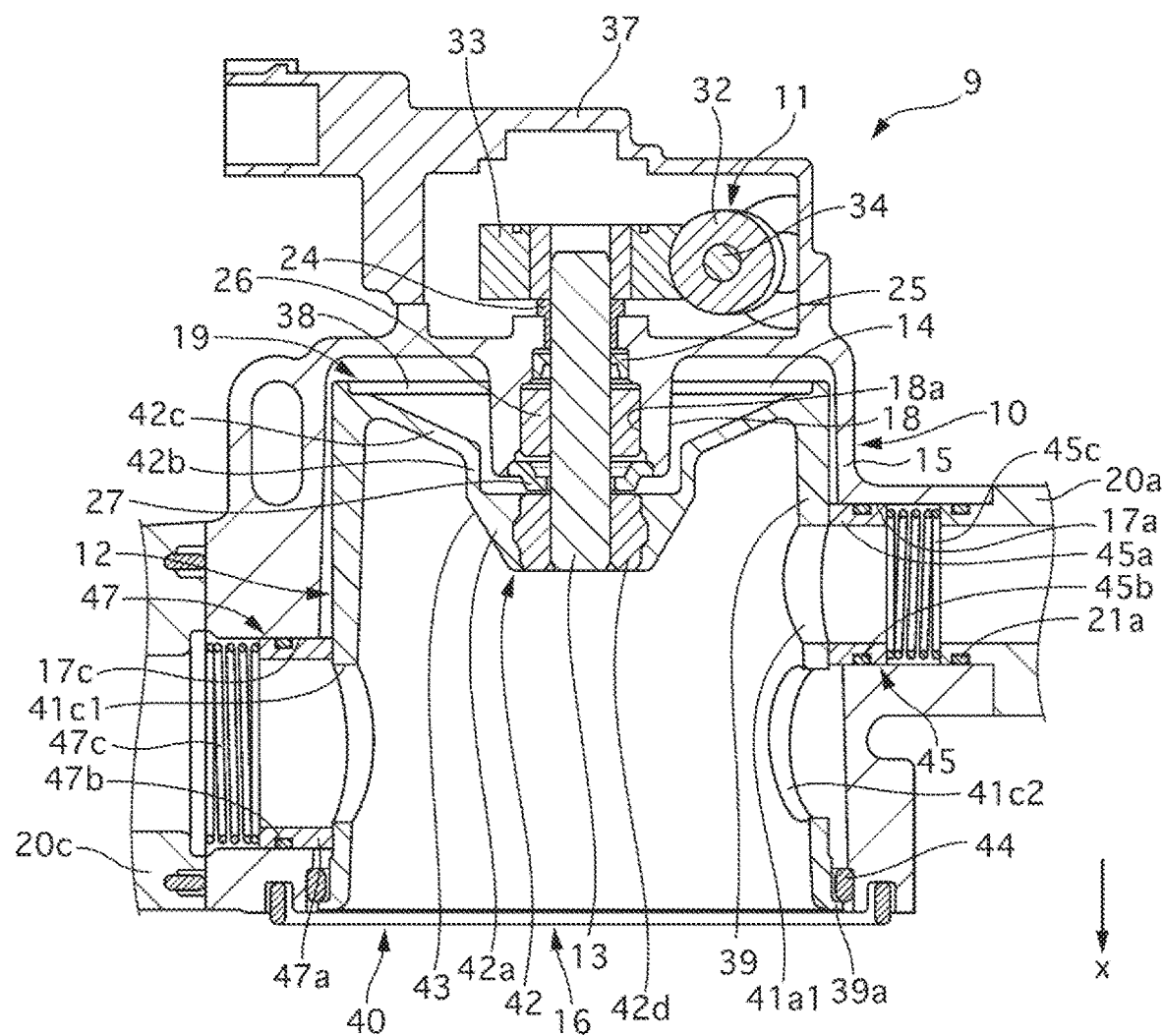
FIG. 6 is a sectional view taken along line S5-S5 of FIG. 4 as viewed from the direction indicated by the arrow.
Figure 7:
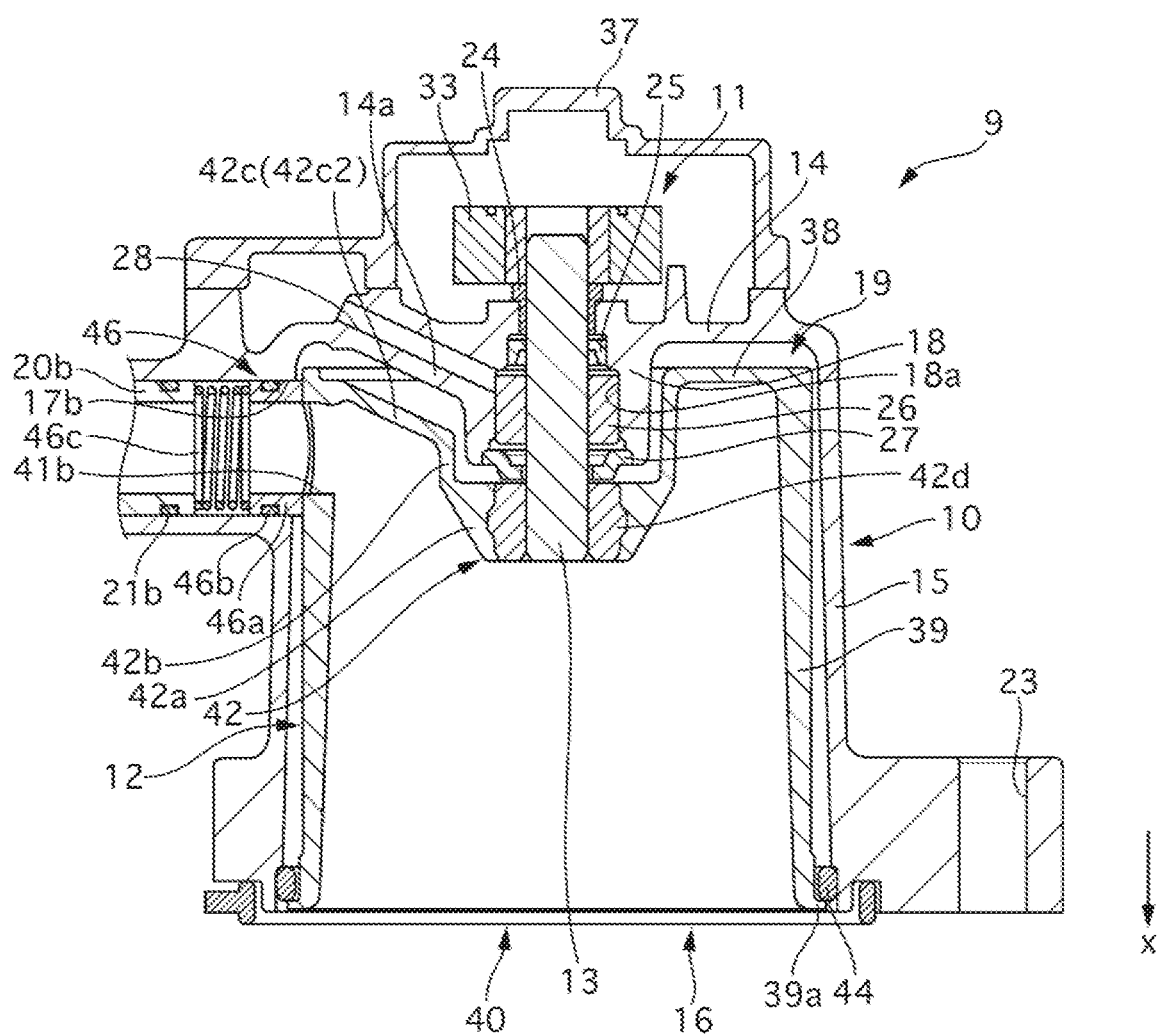
FIG. 7 is a sectional view taken along line S7-S7 of FIG. 4 as viewed from the direction indicated by the arrow.
Figure 8:
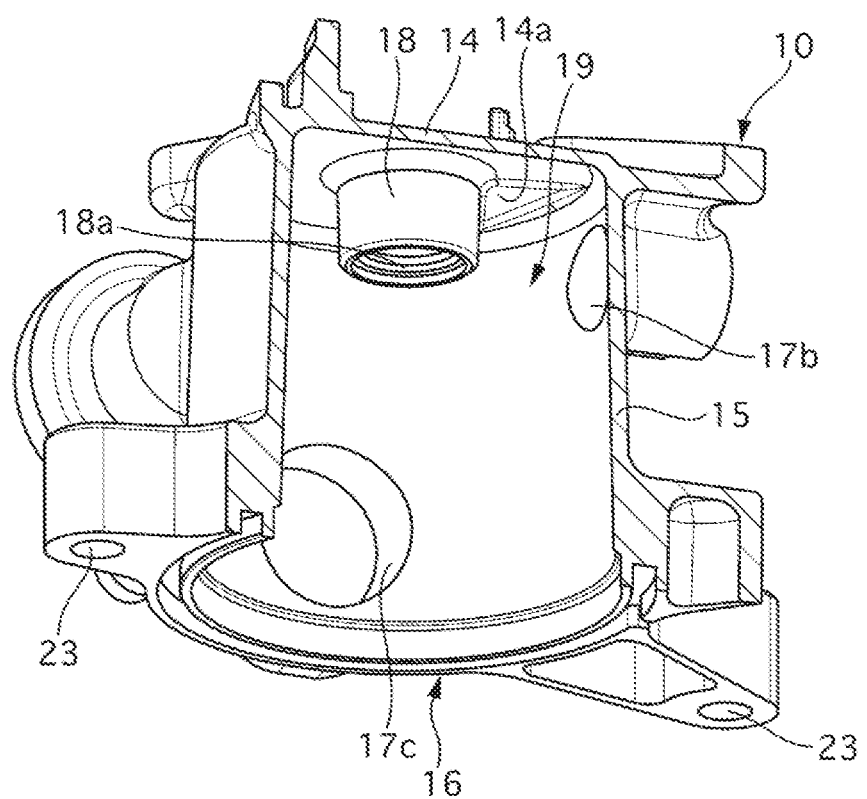
FIG. 8 is a perspective view (showing a housing only) of a section taken along a line S8-S8 of FIG. 4 as viewed from the direction indicated by the arrow.
Figure 9:
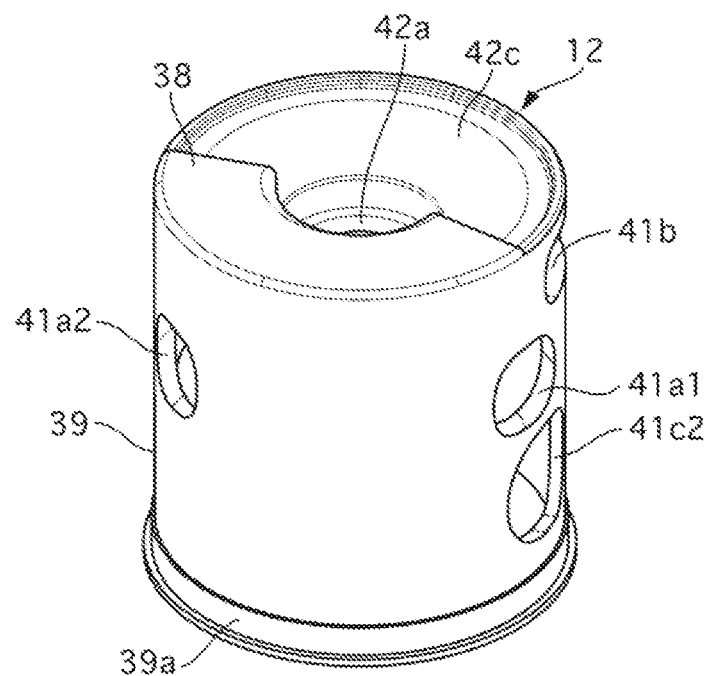
FIG. 9 is a perspective view of a rotor 12 according to the Embodiment 1.
Figure 10:
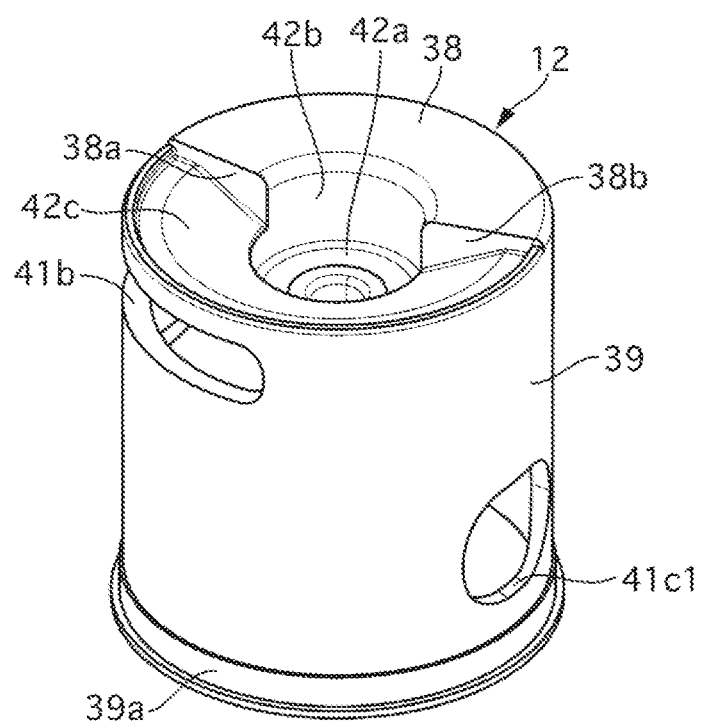
FIG. 10 is a perspective view of the rotor 12 of FIG. 9 in a position turned at 180 degrees.

FIG. 2 is a perspective view of the MCV 9 according to the Embodiment 1. FIG. 3 is an exploded perspective view of the MCV 9. FIG. 4 is a plan view of the MCV 9. FIG. 5 is a perspective view of a section taken along line S5-S5 of FIG. 4 as viewed from the direction indicated by the arrow. FIG. 6 is a sectional view taken along line S5-S5 of FIG. 4 as viewed from the direction indicated by the arrow. FIG. 7 is a sectional view taken along line S7-S7 of FIG. 4 as viewed from the direction indicated by the arrow. FIG. 8 is a perspective view (showing a housing only) of a section taken along a line S8-S8 of FIG. 4 as viewed from the direction indicated by the arrow. FIG. 9 is a perspective view of a rotor 12 according to the Embodiment 1. FIG. 10 is a perspective view of the rotor 12 of FIG. 9 in a position turned at 180 degrees.

The MCV 9 includes the housing 10, a drive mechanism 11, the rotor (valve element) 12, and a drive shaft 13.

Hereinafter, an x-axis represents a direction along a rotational axis of the drive shaft 13. A direction from the drive mechanism 11 toward the rotor 12 along the x-axis is referred to as an x-axis positive direction, and an opposite direction as an x-axis negative direction. A radiation direction of the x-axis is referred to as a radial direction, and a direction around the x-axis as a circumferential direction.

First, a configuration of the housing 10 will be explained.

The housing 10 is formed by casting out of an aluminum alloy material, for example. The housing 10 includes a base portion 14, a circumferential wall 15, a main communicating port 16, a plurality of sub-communicating ports 17, and a bearing portion 18. The base portion 14 has a substantially disk-like shape and is perpendicular to the x-axis direction. The drive shaft 13 extends in the x-axis direction through center of the base portion 14. A stopper 14a is provided in an x-axis positive direction-side surface of the base portion 14. The stopper 14a is protruding in the x-axis positive direction. The circumferential wall 15 has a substantially cylindrical shape and extends from an outer circumference of the base portion 14 in the x-axis positive direction. The circumferential wall 15 is tapered in such a way that an inner diameter increases from the x-axis negative direction side toward the x-axis positive direction side. A valve element housing portion 19 is provided on an inner circumferential side of the circumferential wall 15. The valve element housing portion 19 is a substantially columnar space. The rotor 12 is accommodated in the valve element housing portion 19. The main communicating port 16 is a circular opening portion which is formed at an x-axis positive direction end of the circumferential wall 15 (x-axis positive direction end of the housing 10). The main communicating port 16 is in communication with the valve element housing portion 19. A water passage, which extends from the engine 2, and the valve element housing portion 19 are connected together through the main communicating port 16. The plurality of sub-communicating ports 17 are circular opening portions formed in the circumferential wall 15 and communicate with the valve element housing portion 19. The plurality of sub-communicating ports 17 comprise a first sub-communicating port 17a, a second sub-communicating port 17b, and a third sub-communicating port 17c. The first sub-communicating port 17a has the smallest opening area. The third sub-communicating port 17c has the largest opening area. The second sub-communicating port 17b is located further on the x-axis negative direction side than the first sub-communicating port 17a. The third sub-communicating port 17c is located further on the x-axis positive direction side than the first sub-communicating port 17a. As viewed from the x-axis negative direction side, the second sub-communicating port 17b and the third sub-communicating port 17c are located away from the first sub-communicating port 17a clockwise by 90 and 180 degrees, respectively.

Outlets (conduits) 20a, 20b and 20c functioning as pipe joints are fixed to radial outer sides of the sub-communicating ports 17a, 17b and 17c. The first outlet 20a connects the first sub-communicating port 17a and a water passage extending toward the heater 5. The second outlet 20b connects the second sub-communicating port 17b and a water passage extending toward the transmission fluid warmer 4. The third outlet 20c connects the third sub-communicating port 17c and a water passage extending toward the radiator 3. Outer circumferences of the first and second outlets 20a and 20b and respective inner circumferences of the first and second sub-communicating ports 17a and 17b are sealed with O-rings 21a and 21b at radial inner ends of the first and second outlets 20a and 20b. A fourth sub-communicating port 17d is formed in the housing 10. The fourth sub-communicating port 17d is in constant communication with the main communicating port 16, regardless of a rotation angle of the rotor 12. A fourth outlet 20d functioning as a pipe joint is fixed to a radial outer side of the fourth sub-communicating port 17d. The fourth outlet 20d connects the fourth sub-communicating port 17d and the normally-open water passage 7a. A fifth sub-communicating port 17e is also formed in the housing 10. The fifth sub-communicating port 17e is in communication with the fourth sub-communicating port 17d. A water passage, not shown, is formed in the third outlet 20c. This water passage connects the fifth sub-communicating port 17e and the first sub-communicating port 17a. A thermostat 22 is accommodated in this water passage. The thermostat 22 has a fail-safe function which opens the water passage when the water temperature is excessively increased (to 100 or higher degrees Celsius, for example), and thus accelerates the reduction of the water temperature. The x-axis positive direction end of the housing 10 has three attaching holes 23 into which bolts are inserted when the MCV 9 is bolted to the engine 2.

The bearing portion 18 supports the drive shaft 13 in such a way that the drive shaft 13 is rotatable relative to the housing 10. The bearing portion 18 is formed into a substantially cylindrical shape extending along the x-axis direction. The bearing portion 18 has an x-axis negative direction end which is protruding further toward the x-axis negative direction side than an x-axis negative direction end of the base portion 14. The bearing portion 18 further has an x-axis positive direction end which is protruding further toward the x-axis positive direction side than an x positive direction end of the base portion 14. The x-axis positive direction end of the bearing portion 18 is located further on the x-axis negative direction side than the x-axis positive direction end of the second sub-communicating port 17b. A through-hole 18a is formed in a center of the bearing portion 18. The drive shaft 13 extends through the through-hole 18a. Inside the through-hole 18a, the bearing portion 18 includes a radial thrust bearing (first radial hearing) 24, a dust seal 25, a liquid-tight seal 26, and a thrust bearing 27. The radial thrust bearing 24 is located at the x-axis negative direction end of the bearing portion 18 and receives radial and x-axis forces from the drive shaft 13. The dust seal 25 is located between the radial thrust bearing 24 and the liquid-tight seal 26 in the x-axis direction and prevents the coolant, which has flown into the bearing portion 18, from entering the drive mechanism 11. The liquid-tight seal 26 is located between the dust seal 25 and the thrust bearing 27 in the x-axis direction and prevents the coolant from flowing out of the valve element housing portion 19. The thrust bearing 27 is located at the x-axis positive direction end of the bearing portion 18 and receives the x-axis force from the drive shaft 13. The housing 10 has a relief hole 28 connecting the through-hole 18a and a space on an x-axis negative direction side of the base portion 14. The relief hole 28 is located on the x-axis negative direction side of the stopper 14a. The relief hole 28 functions to discharge the coolant and air, which have flown into the bearing portion 18 (through-hole 18a), to the outside of the housing 10. The relief hole 28 is inclined with respect to the x-axis. The relief hole 28 extends from the through-hole 18a in the x-axis negative direction and a radially outward direction to open in the x-axis negative direction side of the base portion 14. The relief hole 28 extends from the through-hole 18a in the x-axis negative direction and a radially outward direction to open in the x-axis negative direction side of the base portion 14.

A configuration of the drive mechanism 11 will be explained below.

The drive mechanism 11 is located on the x-axis negative direction side of the base portion 14 and rotationally drives the drive shaft 13. The drive mechanism 11 includes an electric motor 29, a motor worm 30, an intermediate gear 31, an intermediate worm 32, and a rotor gear 33. The electric motor 29 is controlled by the engine control unit 101. The electric motor 29 is accommodated in the housing 10 with an output shaft 29a oriented in the x-axis negative direction. The motor worm 30 rotates integrally with the output shaft 29a. The intermediate gear 31 is meshingly engaged with the motor worm 30. The intermediate worm 32 is formed integrally with the intermediate gear 31. An intermediate shaft 34 extends through the center of the intermediate gear 31 and the intermediate worm 32. The intermediate shaft 34 has an axis perpendicular to the x-axis. The intermediate shaft 34 is supported by two shaft support portions 35a and 35b so as to be rotatable about the axis of the intermediate shaft 34. The shaft support portions 35a and 35b extend from the base portion 14 in the x-axis negative direction. The rotor gear 33 is fixed to an x-axis negative direction end of the drive shaft 13 and rotates integrally with the drive shaft 13. A magnet 36 is attached to the x-axis negative direction end of the drive shaft 13. The magnet 36 is not shown in the attached drawings except FIG. 3. The motor worm 30, the intermediate gear 31, the intermediate worm 32, and the rotor gear 33 are accommodated in a gear housing 37. The gear housing 37 includes a magnetoresistive (MR) sensor, not shown. The MR sensor detects a rotation angle of the drive shaft 13, namely, a rotation angle of the rotor 12, on the basis of a change caused in a magnetic field by the rotation of the drive shaft 13. The rotation angle detected by the MR sensor is transmitted to the engine control unit 101.

A configuration of the rotor 12 will be now explained.

The rotor 12 is accommodated in the valve element housing portion 19. The rotor 12 is made of, for example, a synthetic resin material. The rotor 12 includes a bottom portion 38, an outer circumferential portion 39, a main opening portion 40, a plurality of sub-opening portions 41, and an extending portion 42. The bottom portion 38 is located on the x-axis negative direction side of the rotor 12 and perpendicular to the x-axis direction. The bottom portion 38 has a donut-like shape, a little over 180-degree-angle segment of which is cut away with only an outer circumferential portion of the segment left, as viewed from the x-axis negative direction side. The outer circumferential portion 39 has a substantially cylindrical shape extending from an outer circumference of the bottom portion 38 in the x-axis positive direction. The outer circumferential portion 39 is tapered in such a way that an inner diameter increases from the x-axis negative direction side toward the x-axis positive direction side. The outer circumferential portion 39 includes a flange portion 39a extending from the x-axis positive direction end of the outer circumferential portion 39 in the radially outward direction. A slide bearing (second radial bearing) 44 is provided near the x-axis positive direction end of the circumferential wall 15 and further on the x-axis negative direction side than the flange portion 39a. The slide bearing 44 supports the rotor 12 in such a way that the rotor 12 is rotatable relative to the housing 10. The slide bearing 44 receives the radial force froth the rotor 12. The main opening portion 40 is a circular opening portion which is formed at the x-axis positive direction end of the outer circumferential portion 39 (x-axis positive direction end of the rotor 12). The main opening portion 40 is in communication with the main communicating port 16. The plurality of sub-opening portions 41 are opening portions formed in the outer circumferential portion 39. The plurality of sub-opening portions 41 comes into communication with the respective plurality of sub-communicating ports 17a, 17b and 17c when the rotor 12 is positioned within a predetermined rotation angle range. The plurality of opening portions 41 comprise a first sub-opening portion 41a, a second sub-opening portion 41b, and a third sub-opening portion 41c. The first sub-opening portion 41a corresponds to the first sub-communicating port 17a. The second sub-opening portion 41b corresponds to the second sub-communicating port 17b. The third sub-opening portion 41c corresponds to the third sub-communicating port 17c. The second sub-opening portion 41b is located further on the x-axis negative direction side than the first sub-opening portion 41a. The third sub-opening portion 41c is located further on the x-axis positive direction side than the first sub-opening portion 41a. The second sub-opening portion 41b is formed into an elongate hole extending in a circumferential direction. The first and third sub-opening portions 41a and 41c each have a circular shape. The second sub-opening portion 41b is shorter in x-axis length than the first sub-opening portion 41a. The third sub-opening portion 41c is larger in opening area than the second sub-opening portion 41b. The first sub-opening portion 41a includes two opening portions 41a1 and 41a2. The opening portion 41a1 is for summer use, whereas the opening portion 41a2 is for winter use. The third sub-opening portion 41c also includes two opening portions 41c1 and 41c2. The opening portion 41c1 is for summer use, whereas the opening portion 41c2 is for winter use. The first sub-opening portion 41a (41a1, 41a2) overlaps with a first guide portion 43 in the x-axis direction.

The extending portion 42 extends from the outer circumference of the bottom portion 38 in the x-axis positive direction to be joined to the x-axis positive direction end of the drive shaft 13. The extending portion 42 includes a tip portion 42a, a cylindrical portion (tubular portion) 42b, and a second guide portion 42c. The tip portion 42a is provided at an x-axis positive direction end of the extending portion 42. The tip portion 42a is located on the x-axis positive direction side of the bearing portion 18 of the housing 10 and fixed to the drive shaft 13. A metallic insert 42d for reinforcement is embedded in a center of the tip portion 42a and in a joined portion between the tip portion 42a and the drive shaft 13. The rotor 12 is insert-molded with the insert 42d used as an insert. An x-axis positive direction side of the tip portion 42a overlaps with the first sub-communicating port 17a of the housing 10 in the x-axis direction. An x-axis positive direction end of the tip portion 42a is located further on the x-axis negative direction side than the x-axis positive direction end of the first sub-communicating port 17a, and yet further on the x-axis positive direction side than the x-axis negative direction side of the first sub-communicating port 17a. The tip portion 42a has an outer circumferential surface which is provided with the first guide portion 43. The first guide portion 43 is tapered in such a way that a radial dimension increases from the x-axis positive direction side toward the x-axis negative direction side. The cylindrical portion 42b is formed into a cylindrical shape which extends from the first guide portion 43 in the x-axis negative direction. The cylindrical portion 42b has an inner diameter which is larger than an outer diameter of the bearing portion 18. The cylindrical portion 42b overlaps with the bearing portion 18 in the x-axis direction. An x-axial end of the cylindrical portion 42b is connected to the second guide portion 42c in an area where the cut-away segment of the bottom portion 38 is located in the circumferential direction and connected to the bottom portion 38 in an area where the other segment is located. The second guide portion 42c is provided in the cut-away segment of the bottom portion 38 in the circumferential direction and thus connects the cylindrical portion 42b and the outer circumference of the bottom portion 38. The second guide portion 42c is connected to an opening rim on an x-axis negative direction side of the second sub-opening portion 41b. The second guide portion 42c is tapered in such a way that a radial outer shape increases from the x-axis positive direction side toward the x-axis negative direction side. The bottom portion 38 includes two connecting portions 38a and 38b which are connected to the second guide portion 42c. The connecting portions 38a and 38b extend along the x-axis direction. Each of the connecting portions 38a and 38b is circumferentially engaged with the stopper 14a of the base portion 14 when the rotor 12 is positioned at the corresponding predetermined rotation angle. The rotor 12 rotates clockwise as viewed from the x-axis negative direction side from a position where the connecting portion 38a is in contact with the stopper 14a of the base portion 14. The rotor 12 is rotatable within a range of an angle of a little less than 180 degrees upon till the connecting portion 38b comes into contact with the stopper 14a.

Seal portions 45, 46 and 47 provided to the sub-communicating ports 17a, 17b and 17c will be explained below.

The first seal portion 45 is provided to the first sub-communicating port 17a. The first seal portion 45 prevents the coolant from leaking from the first sub-communicating port 17a into a radial clearance between the circumferential wall 15 and the outer circumferential portion 39 while the first sub-communicating port 17a and the first sub-opening portion 41a are in communication. The first seal portion 45 includes a rotor seal 45a, an O-ring 45b, and a coil spring 45c. The rotor seal 45a has a cylindrical shape and is inserted in the first sub-communicating port 17a. The rotor seal 45a has a radial inner end which is in contact with the outer circumferential portion 39. The O-ring 45b seals a gap between an inner circumferential surface of the first sub-communicating port 17a and an outer circumferential surface of the rotor seal 45a. The coil spring 45c is radially interposed between the rotor seal 45a and the first outlet 20a in a compressed position to bias the rotor seal 45a in a radially inward direction. The second seal portion 46 is provided to the second sub-communicating port 17b. The second seal portion 46 prevents the coolant from leaking from the second sub-communicating port 17b into the radial clearance between the circumferential wall 15 and the outer circumferential portion 39 while the second sub-communicating port 17b and the second sub-opening portion 41b are in communication. The second seal portion 46 includes a rotor seal 46a, an O-ring 46b, and a coil spring 46c. The rotor seal 46a has a cylindrical shape and is inserted in the second sub-communicating port 17b. The rotor seal 46a has a radial inner end which is in contact with the outer circumferential portion 39. The O-ring 46b seals a gap between an inner circumferential surface of the second sub-communicating port 17b and an outer circumferential surface of the rotor seal 46a. The coil spring 46c is radially interposed between the rotor seal 46a and the second outlet 20b in a compressed position to bias the rotor seal 46a in the radially inward direction. The third seal portion 47 is provided to the third sub-communicating port 17c. The third seal portion 47 prevents the coolant from leaking from the third sub-communicating port 17c into the radial clearance between the circumferential wall 15 and the outer circumferential portion 39 while the third sub-communicating port 17c and the third sub-opening portion 41c are in communication. The third seal portion 47 includes a rotor seal 47a, an O-ring 47b, and a coil spring 47c. The rotor seal 47a has a cylindrical shape and is inserted in the third sub-communicating port 17c. The rotor seal 47a has a radial inner end which is in contact with the outer circumferential portion 39. The O-ring 47b seals a gap between an inner circumferential surface of the third sub-communicating port 17c and an outer circumferential surface of the rotor seal 47a. The coil spring 47c is radially interposed between the rotor seal 47a and the third outlet 20c in a compressed position to bias the rotor seal 47a in the radially inward direction.

The following description will explain the operation and advantageous effects of the MCV 9 of the Embodiment 1.

The MCV 9 of the Embodiment 1 is so configured that the extending portion 42 is protruding into the space inside the rotor 12. The coolant flowing from the main opening portion 40 toward the x-axis negative direction side therefore collides with the extending portion 42. This causes stagnation of the coolant and might incur a pressure loss of the coolant. If the first sub-opening portion 41a and the second sub-opening portion 41b are provided further on the x-axis positive direction side than the extending portion 42, the pressure loss of the coolant can be reduced. On the other hand, this increases an x-axis dimension of the rotor 12, resulting in an increase in size of the MCV 9.

For a solution to the above issue, the rotor 12 of the Embodiment 1 includes the first guide portion 43 on the outer circumferential side of the extending portion 42, which has the radial outer shape which increases from the x-axis positive direction side toward the x-axis negative direction side. This causes the coolant to flow in the radially outward direction along the shape of the first guide portion 43, allowing the coolant to smoothly flow from the main opening portion 40 to the first sub-opening portion 41a and the second sub-opening portion 41b. Furthermore, the coolant is prevented from colliding with the extending portion 42, which further prevents the stagnation of the coolant in the vicinity of the extending portion 42. This reduces the pressure loss of the MCV 9. There is no need to increase the x-axis dimension of the rotor 12, which prevents the increase in size of the MCV 9.

The extending portion 42 includes the cylindrical portion 42b extending from the first guide portion 43 toward the x-axis negative direction side. This allows a portion of the bearing portion 18 to be accommodated in the cylindrical portion 42b and thus makes the bearing portion 18 overlap with the cylindrical portion 42b in the x-axis direction. The MCV 9 can be accordingly shortened in x-axis dimension.

The extending portion 42 includes the second guide portion 42c which connects the cylindrical portion 42b and the outer circumference of the bottom portion 38. The second guide portion 42c has a radial outer diameter which increases from the x-axis positive direction side toward the x-axis negative direction side. The second guide portion 42c is connected to the opening rim on the x-axis negative direction side of the second sub-opening portion 41b. This causes the coolant to flow from the main opening portion 40 toward the second sub-opening portion 41b along the shape of the second guide portion 42c, allowing the coolant to more smoothly flow from the main opening portion 40 to the second sub-opening portion 41b. The pressure loss therefore can be further reduced.

The rotor 12 includes the connecting portions 38a and 38b which extend in the x-axis direction and connect the bottom portion 38 and the second guide portion 42c. This makes it possible to regulate the rotation angle range of the rotor 12 to fall into the predetermined rotation angle range by using the stopper 14a which is located on the housing 10 side.

The first sub-opening portion 41a overlaps with the first guide portion 43 in the x-axis direction. This allows the coolant to more smoothly flow from the main opening portion 40 to the first sub-opening portion 41a. The pressure loss therefore can be further reduced.

The MCV 9 includes the seal portions 45, 46 and 47 which prevent the coolant from leaking from the sub-opening portions 41a, 41b and 41c into the radial clearance between the housing 10 and the outer circumferential portion 39. This prevents an internal leak of the MCV 9 and restrains a decrease in flow rate of the coolant.

The third sub-opening portion 41c is provided further on the x-axis positive direction side than the first sub-opening portion 41a and is larger in opening area than the first and second sub-opening portions 41a and 41b. Being the closest to the main opening portion 40 and the largest in opening area among the sub-opening portions 41a, 41b and 41c, the third sub-opening portion 41a allows the largest amount of coolant to pass therethrough among the sub-opening portions 41a, 41b and 41c. The third sub-communicating port 17c of the third sub-opening portion 41a is therefore suitable for connection to the radiator 3 which requires the largest amount of coolant among the heat exchangers 3, 4 and 5 installed in the vehicle.

The first sub-opening portion 41a includes the summer-use opening portion 41a1 and the winter-use opening portion 41a2. This makes it possible to achieve the control on flow rate of the coolant in accordance with ambient temperature. The third sub-opening portion 41c also provides similar advantageous effects.

The bearing portion 18 includes the radial thrust bearing 24 which rotatably supports the drive shaft 13. The circumferential wall 15 includes the slide bearing 44 which is provided at the x-axis positive direction end of the circumferential wall 15 and rotatably supports the x-axis positive direction end of the outer circumferential portion 39. In other words, the rotor 12 is provided, at both x-axial ends thereof, with radial bearings which receive a force coming from the radial (radiation) direction. This makes it possible to stably support the rotor 12 and facilitate the rotation of the rotor 12.

The housing 10 includes the relief hole 28 which extends from the bearing portion 18 in a vehicle upward direction (x-axis negative direction) to be connected to the housing 10. The relief hole 28 is inclined with respect to the x-axis. This enables the air which has entered the bearing portion 18 to be discharged out of the housing 10. The inclination of the relief hole 28 with respect to the x-axis eliminates the necessity of increasing the x-axis dimension of the housing 10.

The bearing portion 18 includes the thrust bearing 27 which supports the drive shaft 13. The rotor 12 receives the force on the x-axis negative direction side thereof from the coolant introduced to the main opening portion 40. The rotor 12 is supported by the thrust bearing 27, which makes it possible to support an x-axis (thrust) force acting on the rotor 12.

The outer circumferential portion 39 is tapered in such a way that the inner diameter increases from the x-axis negative direction side toward the x-axis positive direction side. This makes it easy to remove the insert-molded rotor 12 from a resin mold, facilitating a manufacturing process of the rotor 12.

The outer circumferential portion 39 includes a flange portion 39a at the x-axis positive direction end thereof. This prevents the coolant from leaking into the radial clearance between the inner circumferential surface of the circumferential wall 15 and the outer circumferential surface of the outer circumferential portion 39 at the x-axis positive direction end of the outer circumferential portion 39. This prevents the internal leak of the MCV 9 and restrains a decrease in flow rate of the coolant.

The cooling system 1 of the Embodiment 1 includes the plurality of heat exchangers 3, 4 and 5, the circuit 7 which cools the engine 2 by circulating the coolant which has passed through the heat exchanges 3, 4 and 5 to be cooled down by the heat exchanges 3, 4 and 5, and the MCV 9 which controls the flow rate of the coolant circulating in the circuit 7. It is then possible to downsize the cooling system 1 and reduce the pressure loss.

The MCV 9 controls the flow rate of the coolant which flows from the engine 2 toward the heat exchangers 3, 4 and 5. The main communicating port 16 is connected to the engine 2 side. The sub-communicating ports 17a, 17b and 17c are connected to the heat exchangers 3, 4 and 5. It is therefore possible to restrain the pressure loss of the coolant which flows from the engine 2 toward the heat exchangers 3, 4 and 5.

Embodiment 2

Figure 11:
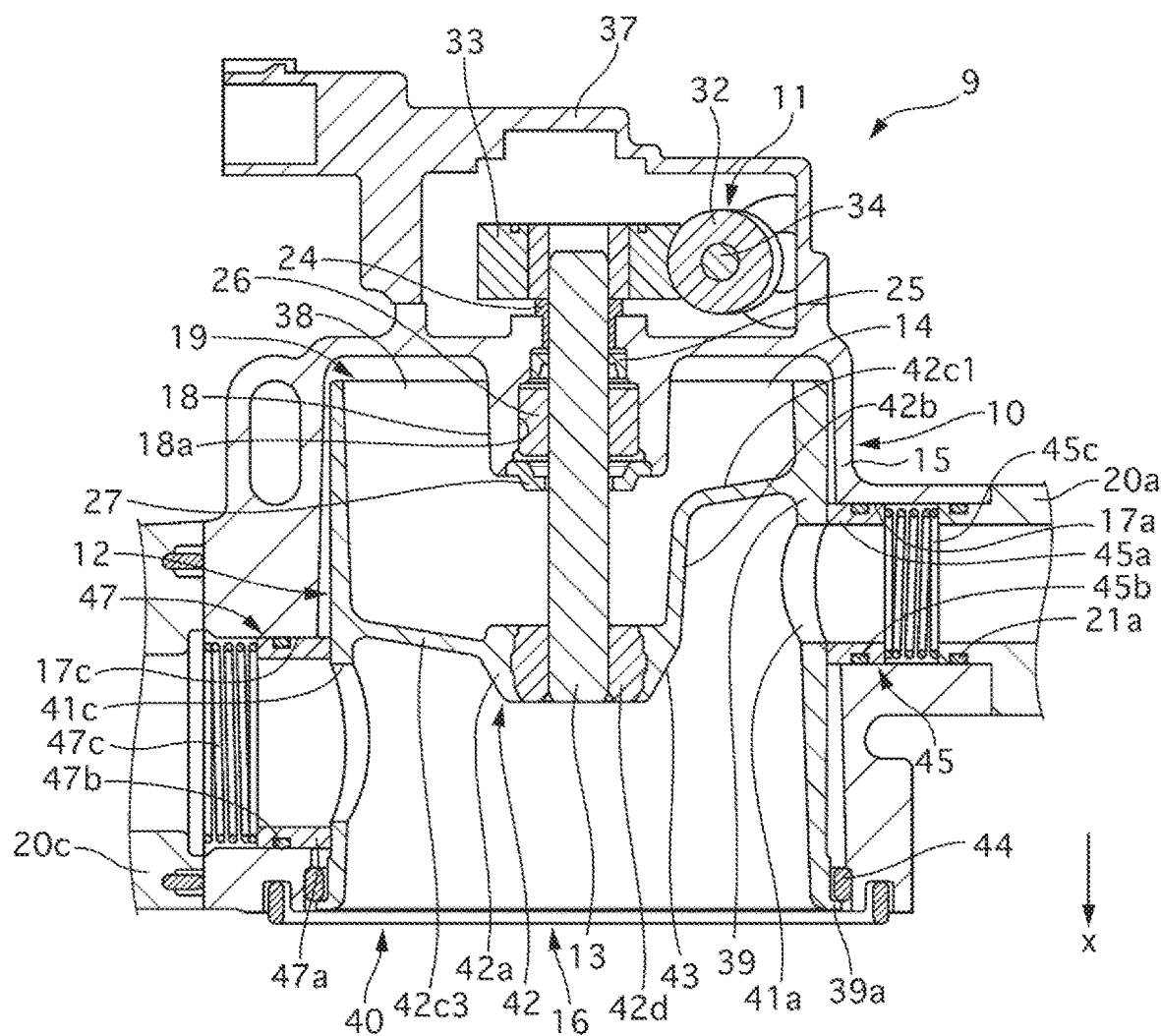
FIG. 11 is a sectional view taken along line S5-S5 of FIG. 4 according to an Embodiment 2 as viewed from the direction indicated by the arrow.

FIG. 11 is a sectional view taken along line S5-S5 of FIG. 4 according to an Embodiment 2 as viewed from the direction indicated by the arrow.

An MCV 90 of the Embodiment 2 differs from the MCV 9 of the Embodiment 1 in the shape of a second guide portion 42c. The Embodiment 2 includes a single first sub-opening portion 41a and a single third sub-opening portion 41c. According to the Embodiment 2, a bearing portion 18 and a cylindrical portion 42b do not overlap with each other in the x-axis direction. The second guide portion 42c of the Embodiment 2 includes not only a second guide portion 42c2 corresponding to a second sub-opening portion, which is connected to an opening rim on an x-axis negative direction side of a second sub-opening portion 41b shown in FIG. 7, but also a second guide portion 42c1 corresponding to a first sub-opening portion, which is connected to an opening rim on an x-axis negative direction side of the first sub-opening portion 41a, and a second guide portion 42c3 corresponding to a third sub-opening portion, which is connected to an opening rim on an x-axis negative direction side of the third sub-opening portion 41c. The second guide portion 42c1 corresponding to the first sub-opening portion connects the cylindrical portion 42b and an outer circumferential portion 39. The second guide portion 42c1 corresponding to the first sub-opening portion is tapered in such a way that a radial outer diameter increases from an x-axis positive direction side toward an x-axis negative direction side. The second guide portion 42c3 corresponding to the third sub-opening portion connects a tip portion 42a and the outer circumferential portion 39. The second guide portion 42c3 corresponding to the third sub-opening portion is tapered in such a way that a radial outer diameter increases from an x-axis positive direction side toward an x-axis negative direction side. The Embodiment 2 is otherwise similar in configuration to the Embodiment 1, and further descriptions of the configuration of the Embodiment 2 will be omitted.

The MCV 90 of the Embodiment 2 includes the second guide portion 42c1 corresponding to the first sub-opening portion, which is connected to the opening rim on the x-axis negative direction side of the first sub-opening portion 41a.

This causes the coolant to flow from a main opening portion 40 toward the first sub-opening portion 41*a* along a shape of the second guide portion 42*c*1 corresponding to the first sub-opening portion, allowing the coolant to more smoothly flow from the main opening portion 40 to the first sub-opening portion 41*a*. The pressure loss therefore can be further reduced. The second guide portion 42*c*3 corresponding to the third sub-opening portion also provides similar advantageous effects.

Embodiment 3

Figure 12:
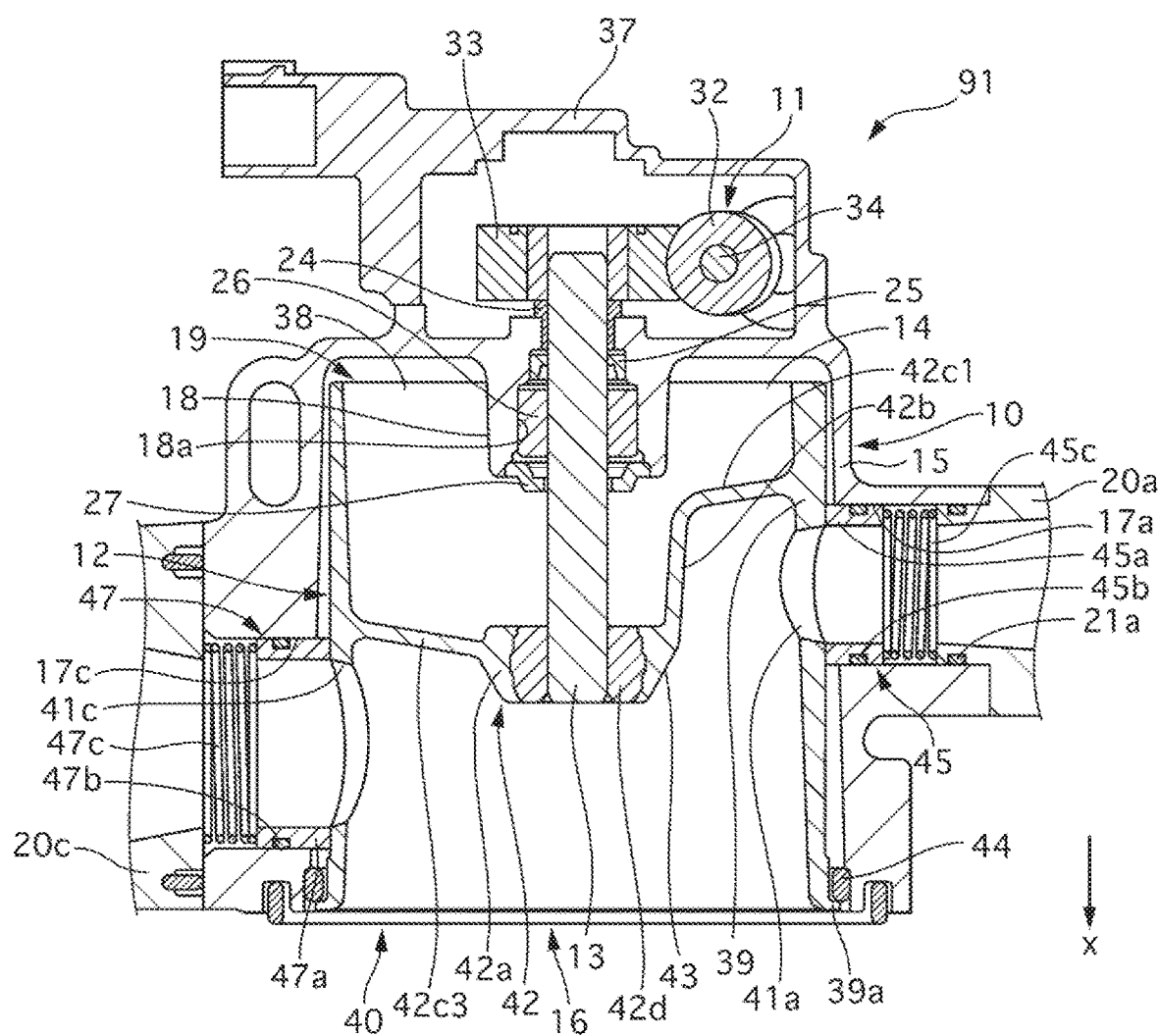
FIG. 12 is a sectional view taken along line S5-S5 of FIG. 4 according to an Embodiment 3 as viewed from the direction indicated by the arrow.

FIG. 12 is a sectional view taken along line S5-S5 of FIG. 4 according to an Embodiment 3 as viewed from the direction indicated by the arrow.

An MCV 91 of the Embodiment 3 differs from the MCV 90 of the Embodiment 2 in shapes of outlets 20*a*, 20*b* and 20*c* connected to sub-communicating ports 17*a*, 17*b* and 17*c*. End portions of the outlets 20*a*, 20*b* and 20*c*, which are located on the sub-communicating ports 17*a*, 17*b* and 17*c* side (radially inward side), each have an inner diameter which is tapered in such a way that opening area gradually increases from a radially inward side toward a radially outward side. Each of the sub-communicating ports 17*a*, 17*b* and 17*c* is also tapered in such a way that opening area gradually increases from the radially inward side toward the radially outward side. The Embodiment 3 is otherwise similar in configuration to the Embodiment 2, and further descriptions of the configuration of the Embodiment 3 will be omitted.

The MCV 91 of the Embodiment 3 makes it possible to reduce the pressure loss of the coolant since the sub-communicating ports 17*a*, 17*b* and 17*c* are connected to the outlets 20*a*, 20*b* and 20*c* whose opening area increases from the radially inward side toward the radially outward side.

Embodiment 4

Figure 13:
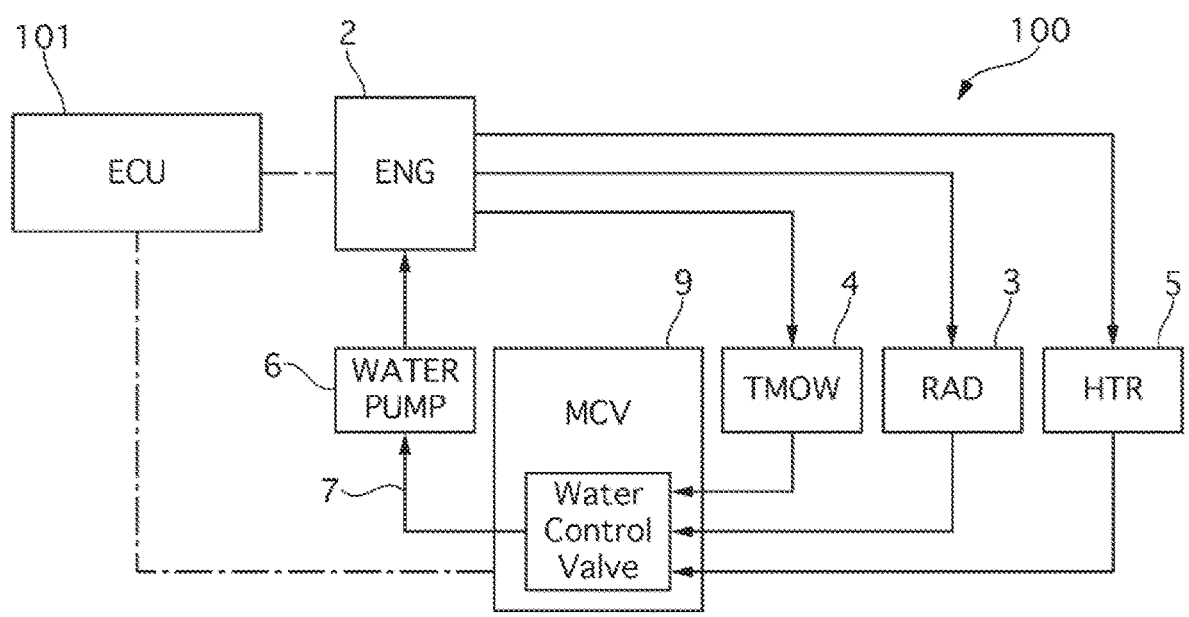
FIG. 13 is a schematic view of a cooling system 100 according to an Embodiment 4.

FIG. 13 is a schematic view of a cooling system 100 according to an Embodiment 4.

In the cooling system 100 of the Embodiment 4, an MCV 9 adjusts a flow rate of coolant which is fed from heat exchangers 3, 4 and 5 to a water pump 6. The MCV 9 includes a main communicating port 16 which connects a valve element housing portion 19 and a water passage extending toward the water pump 6. A first outlet 20*a* connects a water passage, which extends from the heater 5, and a first sub-communicating port 17*a*. A second outlet 20*b* connects a water passage, which extends from the transmission fluid warmer 4, and a second sub-communicating port 17*b*. A third outlet 20*c* connects a water passage, which extends from the radiator 3, and a third sub-communicating port 17*c*. The Embodiment 4 is otherwise similar in configuration to the Embodiment 1, and further descriptions of the configuration of the Embodiment 4 will be omitted.

The cooling system 100 of the Embodiment 4 is so configured that the MCV 9 controls the flow rate of the coolant which flows from the heat exchangers 3, 4 and 5 toward an engine 2 (intake side of the water pump 6), that a main communicating port 16 is connected to the engine 2, and that the sub-communicating ports 17*a*, 17*b* and 17*c* are connected to the heat exchangers 3, 4 and 5. It is then possible to restrain a pressure loss of the coolant which flows from the heat exchangers 3, 4 and 5 toward the engine 2.

Other Embodiments

The embodiments for carrying out the invention have been explained. The specific configuration of the invention is not limited to those of the embodiments, and all design modifications and the like made without deviating from the gist of the invention are intended to be included in the invention.

The heat source of the cooling system does not have to be an engine and may be an internal combustion engine, a fuel cell or other like heat sources.

The radial thrust bearing of the bearing portion may be a radial bearing.

The number of the sub-communicating ports and of the sub-opening portions may be two, four or more.

Technical ideas which can be understood from the foregoing embodiments are as follows.

According to one aspect, a flow control valve comprises a drive shaft; a housing including a base portion through which the drive shaft extends, a circumferential wall extending from an outer circumference of the base portion toward one axial side of an axial direction, when a direction along an axis of the drive shaft is defined as the axial direction, a valve element housing portion being provided on an inner circumferential side, a main communicating port provided in an end portion on the one axial side of the circumferential wall and communicating with the valve element housing portion, a plurality of sub-communicating ports formed in the circumferential wall and communicating with the valve element housing portion, and a bearing portion formed to protrude from the base portion toward the one axial side and configured to rotatably support the drive shaft; a drive mechanism provided in the other axial side of the base portion and configured to rotationally drive the drive shaft; and a valve element accommodated in the valve element housing portion, the valve element including a bottom portion, an outer circumferential portion which extends from an outer circumference of the bottom portion toward the one axial side, a main opening portion provided in an end portion on the one axial side of the outer circumferential portion and communicating with the main communicating port, a plurality of sub-opening portions formed in the outer circumferential portion and communicating with the respective sub-communicating ports when the valve element is positioned within a predetermined rotation angle range, an extending portion which extends from the bottom portion or the outer circumferential portion toward the one axial side and is fixed to an end portion on the one side of the drive shaft, and a first guide portion provided on an outer circumferential side of the extending portion and having a radial outer shape which increase from the one axial side toward the other axial side, when a direction radial to the axis is defined as a radial direction.

A further preferable aspect according to the above-described aspect is so configured that the extending portion includes a tubular portion which extends from the first guide portion toward the other axial side.

Another preferable aspect according to any one of the above-described aspects is so configured that the extending portion includes a second guide portion which connects the cylindrical portion and the outer circumference of the bottom portion or the outer circumferential portion, the second guide portion having a radial outer shape which increases from the one axial side toward the other axial side.

Still another preferable aspect according to any one of the above-described aspects is so configured that the valve element includes a connecting portion extending in the axis direction and connecting the bottom portion and the second guide portion.

Still another preferable aspect according to any one of the above-described aspects is so configured that at least one of the plurality of sub-opening portions overlaps with the first guide portion in the axis direction.

Still another preferable aspect according to any one of the above-described aspects includes a seal portion configured to prevent fluid from leaking from one of a pair of one of the plurality of sub-communicating ports and a corresponding one of the plurality of sub-opening portions into a radial clearance between the housing and the outer circumferential portion.

Still another preferable aspect according to any one of the above-described aspects is so configured that the plurality of sub-communicating ports include a first sub-communicating port and a second sub-communicating port provided further on the other axial side than the first sub-communicating port, and that the plurality of sub-opening portions include a first sub-opening portion corresponding to the first sub-communicating port and overlapping with the first guide portion in the axis direction, and a second sub-opening portion corresponding to the second sub-communicating port.

Still another preferable aspect according to any one of the above-described aspects is so configured that the valve element includes a second guide portion connected to an opening rim on the other axial side of the second sub-opening portion, the second guide portion having a radial outer shape which increases from the one axial side toward the other axial side.

Still another preferable aspect according to any one of the above-described aspects is so configured that the plurality of sub-communicating ports include a third sub-communicating port provided further on the one axial side than the first sub-communicating port, and that the plurality of sub-opening portions include a third sub-opening portion corresponding to the third sub-communicating port and being larger in opening area than the first sub-opening portion.

Still another preferable aspect according to any one of the above-described aspects is so configured that at least either the first sub-communicating port or the second sub-communicating port comprises two or more first or second sub-communicating ports.

Still another preferable aspect according to any one of the above-described aspects is so configured that the bearing portion includes a first radial bearing which rotatably supports the drive shaft, and that the circumferential wall includes a second radial bearing which is provided in an end portion on the one axial side and rotatably supports the end portion on the one axial side of the outer circumferential portion.

Still another preferable aspect according to any one of the above-described aspects is so configured that the housing includes a relief hole which connects a bearing portion and an exterior portion of the housing and is inclined with respect to the axis.

Still another preferable aspect according to any one of the above-described aspects is so configured that the bearing portion includes a thrust bearing which supports the drive shaft.

Still another preferable aspect according to any one of the above-described aspects is so configured that at least one of the plurality of sub-communicating ports is connected to a conduit and the opening area of the conduct increases from a radially inward side toward a radially outward side.

Still another preferable aspect according to any one of the above-described aspects is so configured that the outer circumferential portion has an inner diameter which increases from the other axial side toward the one axial side.

Still another preferable aspect according to any one of the above-described aspects is so configured that the outer circumferential portion includes a flange portion in an end portion on the one axial side.

From another perspective, a flow control valve comprises a drive shaft; a housing including a valve element housing portion provided in one axial side of an axial direction of the drive shaft, when a direction along an axis of the drive shaft is defined as the axial direction, a main communicating port provided in the one axial side of the valve element housing portion and communicating with the valve element housing portion, and a plurality of sub-communicating ports communicating with the valve element housing portion from a radial direction, when a direction radial to the axis is defined as the radial direction; a drive mechanism provided in the other axial side of the drive shaft and configured to rotationally drive the drive shaft; and a valve element accommodated in the valve element housing portion, the valve element including a bottom portion, an outer circumferential portion extending from an outer circumference of the bottom portion toward the one axial side, a shaft support portion provided further on the one axial side than the bottom portion and configured to receive torque of the drive shaft, a main opening portion provided in an end portion on the one axial side of the outer circumferential portion and communicating with the main communicating port, a plurality of sub-opening portions formed in the outer circumferential portion and overlapping in a radial direction with the respective plurality of sub-communicating ports when the valve element is positioned within a predetermined rotation angle range, when a direction radial to the axis is defined as the radial direction; and a guide portion extending from an outer circumference of the bottom portion or the outer circumferential portion toward the one axial side and toward the radially inward side to be connected to the shaft support portion.

From still another perspective, a cooling system comprises a plurality of heat exchangers configured to cool fluid which has flown into the plurality of heat exchangers; a circuit configured to cool a heat source by circulating the fluid which has passed through the plurality of heat exchangers to be cooled down by the heat exchangers; and a flow control valve configured to control a flow rate of the fluid circulated in the circuit, the flow control valve comprising a drive shaft; a housing including a base portion through which the drive shaft extends, a circumferential wall extending from an outer circumference of the base portion toward one axial side of an axial direction, when a direction along an axis of the drive shaft is defined as the axial direction, a valve element housing portion being provided on an inner circumferential side of the circumferential wall, a main communicating port provided in an end portion on the one axial side of the circumferential wall and communicating with the valve element housing portion, a plurality of sub-communicating ports formed in the circumferential wall and communicating with the valve element housing portion, and a bearing portion formed to protrude from the base portion toward the one axial side and configured to rotatably support the drive shaft; a drive mechanism provided in the other axial side of the base portion and configured to rotationally drive the drive shaft; and a valve element accommodated in the valve element housing portion, the valve element including a bottom portion, an outer circumferential portion extending from an outer circumference of the bottom portion toward the one axial side, a main opening portion provided in an end portion on the one axial side of the outer circumferential portion and communicating with the main communicating port, a plurality of sub-opening portions formed in the outer circumferential portion and configured to come into communication with the respective plurality of sub-communicating ports when the valve element is positioned within a predetermined rotation angle range, an extending portion which extends from the bottom portion or the outer circumferential portion toward the one axial side and is fixed to an end portion on the one side of the drive shaft, and a first guide portion provided on an outer circumferential side of the extending portion and having a radial outer shape which increases from the one axial side toward the other axial side, when a direction radial to the axis is a radial direction.

Preferably, according to the above-described aspect, the flow control valve controls the flow rate of the fluid which flows from the heat source toward the plurality of heat exchangers; the main communicating port is connected to the heat source side; and the plurality of sub-communicating ports are connected to the plurality of heat exchangers side.

Another preferable aspect according to any one of the above-described aspects is configured that the flow control valve controls the flow rate of the fluid which flows from the plurality of heat exchangers toward the heat source, that the main communicating port is connected to the heat source side, and that the plurality of sub-communicating ports are connected to the plurality of heat exchangers side.

The invention is not limited to the embodiments and includes various modifications. For example, the embodiments have been explained in details for ease of understanding of the invention, and the invention does not necessarily have to include all the configurations discussed above. A part of the configuration of any one of the embodiments may be replaced with the configuration of another embodiment. The configuration of any one of the embodiments may be incorporated into the configuration of another embodiment. It is also possible to incorporate or replace a part of the configuration of any one of the embodiments into or with the configuration of another embodiment, or eliminate a part of the configuration of any one of the embodiments.

The present application claims priority under Japanese Patent Application No. 2016-183645 filed on Sep. 21, 2016. The entire disclosure of Japanese Patent Application No. 2016-183645 filed on Sep. 21, 2016, including the description, claims, drawings and abstract, is incorporated herein by reference in its entirety.

REFERENCE SIGN LIST

1: Cooling system
2: Engine (heat source)
3: Radiator (heat exchanger)
4: Transmission fluid warmer (heat exchanger)
5: Heater (heat exchanger)
7: Circuit
9: Mechanical control valve (flow control valve)
10: Housing
11: Drive mechanism
12: Rotor (valve element)
13: Drive shaft
14: Base portion
15: Circumferential wall
16: Main communicating port
17: Sub-communicating port
17a: First sub-communicating port
17b: Second sub-communicating port
17c: Third sub-communicating port
18: Bearing portion
19: Valve element housing portion
20a: First outlet (conduit)
20b: Second outlet (conduit)
20c: Third outlet (conduit)
24: Radial thrust bearing (first radial bearing)
27: Thrust bearing
28: Relief hole
38: Bottom portion
38a: Connecting portion
38b: Connecting portion
39: Outer circumferential portion
39a: Flange portion
40: Main opening portion
41: Sub-opening portion
41a: First sub-opening portion
41b: Second sub-opening portion
41c: Third sub-opening portion
42: Extending portion
42b: Cylindrical portion (tubular portion)
42c: Second guide portion
43: First guide portion
44: Slide bearing (second radial bearing)
45: First seal portion (seal portion)
46: Second seal portion (seal portion)
47: Third seal portion (seal portion)
100: Cooling system

The invention claimed is:

1. A flow control valve comprising:
a drive shaft;
a housing including
a base portion through which the drive shaft extends,
a circumferential wall extending from an outer circumference of the base portion toward one axial side of an axial direction, when a direction in which the drive shaft extends is defined as the axial direction,
a valve element housing portion being provided on an inner circumferential side of the circumferential wall,
a main communicating port opened in an end portion on the one axial side of the circumferential wall,
a plurality of sub-communicating ports opened in the circumferential wall and communicating with the valve element housing portion, and
a bearing portion provided on the base portion and configured to rotatably support the drive shaft;
a drive mechanism configured to rotationally drive the drive shaft from another axial side of the axial direction opposite to the one axial side with respect to the base portion; and
a valve element accommodated in the valve element housing portion,
the valve element including
a bottom portion,
an outer circumferential portion extending from an outer circumference of the bottom portion toward the one axial side,
a main opening portion opened in an end portion on the one axial side of the outer circumferential portion and connecting with the main communicating port,
a plurality of sub-opening portions formed in the outer circumferential portion and configured to come into communication with the respective plurality of sub-communicating ports when the valve element is positioned within a predetermined rotation angle range,
an extending portion which extends from the bottom portion toward the one axial side and is fixed to the drive shaft, and a first guide portion provided on an outer circumference of a tip portion of the extending portion and having an outer diameter which increases from the one axial side toward the other axial side in a direction radial to the axial direction.

2. The flow control valve according to claim 1,
wherein the extending portion includes a tubular portion extending from the first guide portion toward the other axial side.

3. The flow control valve according to claim 2,
wherein the extending portion includes a second guide portion connecting the tubular portion and the outer circumference of the bottom portion or the outer circumferential portion, the second guide portion having a radial outer shape which increases from the one axial side toward the other axial side.

4. The flow control valve according to claim 3,
wherein the valve element includes a connecting portion, the connecting portion extending in the axial direction and connecting the bottom portion and the second guide portion.

5. The flow control valve according to claim 2,
wherein at least one of the plurality of sub-opening portions overlaps with the first guide portion in the axial direction.

6. The flow control valve according to claim 2,
wherein the flow control valve includes a seal portion,
the seal portion being configured to prevent fluid from leaking from one of a pair of one of the plurality of sub-communicating ports and a corresponding one of the plurality of sub-opening portions into a radial clearance between the housing and the outer circumferential portion.

7. The flow control valve according to claim 1,
wherein the plurality of the sub-communicating ports include a first sub-communicating port and a second sub-communicating port provided further on the other axial side than the first sub-communicating port; and
wherein the plurality of sub-opening portions include a first sub-opening portion corresponding to the first sub-communicating port and overlapping with the first guide portion in the axial direction, and a second sub-opening portion corresponding to the second sub-communicating port.

8. The flow control valve according to claim 7,
wherein the valve element includes a second guide portion, the second guide portion being connected to an opening rim on the other axial side of the second sub-opening portion, and having a radial outer shape which increases from the one axial side toward the other axial side.

9. The flow control valve according to claim 7,
wherein the plurality of sub-communicating ports include a third sub-communicating port provided further on the one axial side than the first sub-communicating port; and
wherein the plurality of sub-opening portions include a third sub-opening portion corresponding to the third sub-communicating port and being larger in opening area than the first sub-opening portion.

10. The flow control valve according to claim 7,
wherein the number of at least one of the first sub-communicating port and the second sub-communicating port is two or more.

11. The flow control valve according to claim 1,
wherein the bearing portion includes a first radial bearing configured to rotatably support the drive shaft; and
wherein the circumferential wall includes a second radial bearing provided in an end portion on the one axial side, the second radial bearing being configured to rotatably support the end portion on the one axial side of the outer circumferential portion.

12. The flow control valve according to claim 11,
wherein the housing includes a relief hole connecting the bearing portion and an exterior portion of the housing and inclined with respect to the direction in which the drive shaft extends.

13. The flow control valve according to claim 11,
wherein the bearing portion includes a thrust bearing configured to support the drive shaft.

14. The flow control valve according to claim 1,
wherein at least one of the plurality of sub-communicating ports is connected to a conduit, and an opening area of the conduit increases from a radially inward side toward a radially outward side.

15. The flow control valve according to claim 1,
wherein the outer circumferential portion has an inner diameter which increases from the other axial side toward the one axial side.

16. The flow control valve according to claim 15,
the outer circumferential portion includes a flange portion in an end portion on the one axial side.

17. A flow control valve, comprising:
a drive shaft;
a housing including
a valve element housing portion provided at one axial side of an axial direction of the drive shaft, wherein a direction along an axis of the drive shaft is defined as the axial direction,
a main communicating port provided in the one axial side of the valve element housing portion and communicating with the valve element housing portion, and
a plurality of sub-communicating ports communicating with the valve element housing portion from a radial direction, wherein a radial direction of the axis is defined as the radial direction;
a drive mechanism provided at another axial side of the drive shaft and configured to rotationally drive the drive shaft; and
a valve element accommodated in the valve element housing portion,
the valve element including
a bottom portion,
an outer circumferential portion which extends from an outer circumference of the bottom portion toward the one axial side,
a shaft support portion provided further on the one axial side than the bottom portion and configured to receive torque of the drive shaft,
a main opening portion provided in an end portion on the one axial side of the outer circumferential portion and communicating with the main communicating port,
a plurality of sub-opening portions formed in the outer circumferential portion and overlapping with the respective plurality of sub-communicating ports in the radial direction when the valve element is positioned within a predetermined rotation angle range; and
a guide portion which extends obliquely from an outer circumference of the bottom portion or the outer circumferential portion toward the one axial side and toward a radially inward side to be connected to the shaft support portion.

18. A cooling system comprising:
a plurality of heat exchangers configured to cool fluid which has flowed into the plurality of heat exchangers;
a circuit configured to cool a heat source by circulating the fluid which has passed through the plurality of heat exchangers to be cooled down by the heat exchangers; and
a flow control valve configured to control a flow rate of the fluid circulated in the circuit, the flow control valve comprising:
a drive shaft;
a housing including
   a base portion through which the drive shaft extends,
   a circumferential wall extending from an outer circumference of the base portion toward one axial side of an axial direction, when a direction along an axis of the drive shaft is defined as the axial direction, a valve element housing portion being provided on an inner circumferential side of the circumferential wall,
   a main communicating port provided in an end portion on the one axial side of the circumferential wall and communicating with the valve element housing portion,
   a plurality of sub-communicating ports formed in the circumferential wall and communicating with the valve element housing portion, and
   a bearing portion provided on the base portion and configured to rotatably support the drive shaft;
a drive mechanism provided in another axial side of the base portion and configured to rotationally drive the drive shaft; and
a valve element accommodated in the valve element housing portion,
the valve element including
   a bottom portion,
   an outer circumferential portion which extends from an outer circumference of the bottom portion toward the one axial side,
   a main opening portion provided in an end portion on the one axial side of the outer circumferential portion and communicating with the main communicating port,
   a plurality of sub-opening portions formed in the outer circumferential portion and configured to come into communication with the respective plurality of sub-communicating ports when the valve element is positioned within a predetermined rotation angle range,
   an extending portion which extends from the bottom portion or the outer circumferential portion toward the one axial side and is fixed to the drive shaft, and
   a first guide portion provided on an outer circumferential side of the extending portion and having a radial outer shape which increases from the one axial side toward the other axial side, when a direction radial to the axis is a radial direction.

19. The cooling system according to claim 18,
wherein the flow control valve controls the flow rate of the fluid which flows from the heat source toward the plurality of heat exchangers; and
wherein the main communicating port is connected to a side of the heat source, and the plurality of sub-communicating ports are connected to a side of the plurality of heat exchangers.

20. The cooling system according to claim 18,
wherein the flow control valve controls the flow rate of the fluid which flows from the plurality of heat exchangers toward the heat source; and
wherein the main communicating port is connected to a side of the heat source, and the plurality of sub-communicating ports are connected to a side of the plurality of heat exchangers.

\* \* \* \* \*